May 18, 1965  TOMOYOSHI TAKASAKA ETAL  3,183,766
PHOTOGRAPHIC PRINTING APPARATUS
Filed June 9, 1961

INVENTORS
TOMOYOSHI TAKASAKA
MITSUO NAGAYAMA
By Raymond W Boller
ATTORNEY

United States Patent Office 3,183,766
Patented May 18, 1965

3,183,766
PHOTOGRAPHIC PRINTING APPARATUS
Tomoyoshi Takasaka and Mitsuo Nagayama, Tokyo, Japan, assignors to Logetronics Inc., Alexandria, Va., a corporation of Delaware
Filed June 9, 1961, Ser. No. 116,133
Claims priority, application Japan, June 15, 1960, 35/27,768
7 Claims. (Cl. 88—24)

It is already known that such a printing device as mentioned below is available to obtain a positive with satisfactory contrast at all times from an original plate of photographic film or plate:

A scanning spot of light on the fluorescent screen of cathode ray tube is used as the printing light source and projected onto the original plate; the corresponding small areas are, one by one, printed to the photo sensitive paper as the scanning process goes on; part of the flux of the said printing light passing through the original plate is deflected by a half mirror, transmitted to a phototube and its output signal is fed back to and impressed on the control electrode of the cathode ray tube after amplified; thus adjusting the amount of printing light in accordance with the density of the original plate. As a result of this, the contrast of the area larger than of the spot of light is decreased, while within the area of the spot of light is emphasized by the steep curve of the central portion of characteristic curve of the printing paper or the film. Thus, a quite satisfactory over-all contrast is obtained, making the best use of the characteristics of the printing paper or the film.

It is among the objects of the present invention to provide photographic printing apparatus of which an epoch-making result can be expected by further improvement of a photographic printing device as described above. That is to say, the features of this invention are as follows: In a printing device employing a cathode ray tube like one described above, we use, as a scanning spot of light, a spot of light which is by far smaller than the conventional one; in the feed-back loop of the phototube output adjusting the amount of light corresponding to the density of an original picture to be printed, a frequency divider and amplifiers are arranged newly; the output amplified via phototube is divided into low frequency and high frequency component by the divider; they are then amplified respectively by the corresponding amplifiers and the low frequency output is impressed in the form of negative feed-back on the brightness control electrode of the cathode ray tube, while the high frequency output is similarly impressed in the manner of positive feed-back; thus, the contrast for a large area is reduced down to a proper value whereas the contrast for a small area (detail contrast) can be increased. More particularly, a method of representing contrast depending only on the photosensitive characteristics of a printing paper or a film has been adopted in the past for a small area within a scanning spot of light. In the conventional method, in short, the increase of contrast for a small area has been made by using part of the exposure versus density characteristics curve of the printing paper or the film to be printed where the density variation as against the exposure variation is large. Therefore, the increase was made dependent on the photosensitive characteristics and had been unable to be controlled as one intended to do.

According to the present invention, the contrast for a small area is made possible to positively expand and increase as a result of impressing, in the manner of positive feed-back, the high frequency output on the brightness control electrode of cathode ray tube appearing in the output of phototube at the time the miniature spot of light passes through a small area. At the same time, a satisfactory dodging effect is obtained in the same manner as ever for the contrast in a large area, by impressing the low frequency output on the said electrode in the output of phototube. Above mentioned explanation is related in such case as the contrast of the large area of the original picture is excessively high, however on the contrary, in case the contrast of the large area of original picture is excessively low, the said low frequency output may be fed back with the polarity being reversed (that is positively) and impressed on the brightness control electrode of the cathode ray tube. In this case, the relation between compression and expansion will be made reverse and the contrast of large area to be printed will expand, producing a proper contrast as well.

Employed in in the past as a light source was a so-called out-of-focus spot of light such as a comparatively large scanning spot of light to be produced by an electron beam of which the focus was usually displaced from the fluorescent surface intentionally, or such a spot of light which was made out of focus at the time of projection to be made through an optical device.

It is also among the objects of the present invention to provide photographic printing apparatus employing a scanning spot of light which focuses especially sharp on the fluorescent surface and further on the original plate through an optical lens system so as to attain these objects described hereinbefore.

A more complete understanding of the invention will follow a description of the accompanying drawing wherein.

Figure 1:
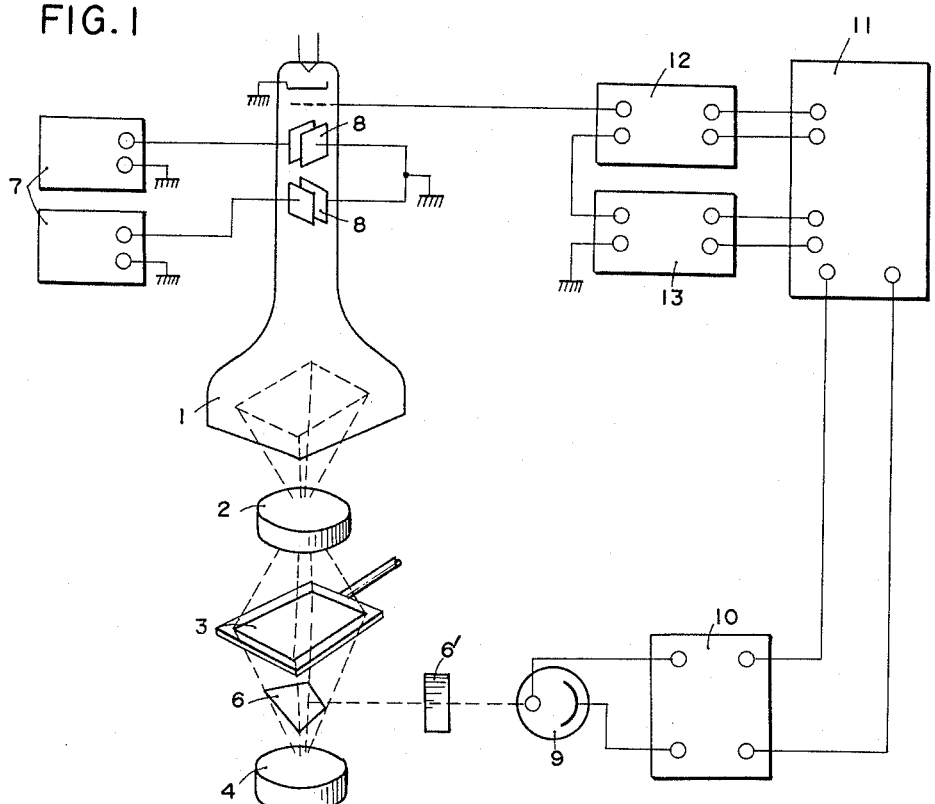
FIG. 1 is a diagrammatic illustration of an apparatus employing the present invention.

A cathode ray tube 1 produces a quite small spot of light on its fluorescent surface by electron beam projected from the electron gun and focused sharply on said surface. A beam of light which projected from the said spot of light focuses on an original plate 3 to form an image of the said spot of light on it by an optical device depicted as a lens 2. After passing through the original plate, the light beam focuses on a photo sensitive paper or film 5 to form the image of the original on it by a optical device depicted as a lens 4. A half mirror 6 directs part of the beam of light passing through said original plate, into a phototube 9 through an optical device depicted as a lens 6'. 7 is a vertical and horizontal deflecting voltage generator for generating two dimensional figure on the fluorescent surface with the said electron beam spot. 8 is a deflecting electrode for electron beam. An amplifier 10 amplifies the output of the said phototube 9 to a proper level. A frequency divider (or a high and low pass filter) 11 divides an alternating current, included in the output of the said phototube, into high and low frequency. 12 is an amplifier for the said high frequency. 13 is also an amplifier for the said low frequency. The output of the said two amplifiers 12, 13 are composed and are impressed to the brightness control electrode of the said cathode ray tube.

In addition, if the amplifier 12 for the high frequency will be a automatic gain control type, it would be more effective in such apparatus.

Now, if the very small spot of light produced by such light source as mentioned above scans the original plate 3, the light beam passing through the said plate varies its intensity in a long period cycle for the contrast over a large area on the original picture and in a short period cycle for the contrast over a small area (detail). Accordingly, this means that the output of the phototube to be exerted by part of this light beam includes low frequency alternating current for the contrast over a large area and high frequency alternating current for the detail contrast. Then, as described above, the contrast for a large area is made proper by impressing, in the form of negative feed-back, the low frequency on the brightness control electrode of the cathode ray tube while the minute contrast within a small area can be expanded and increased by impressing, in the manner of positive feedback, the high frequency. In addition, the contrast of the details can be freely controlled by adjusting the degree of the positive feed-back, independently from the characteristics of the photo sensitive materials.

It is also among the objects of the present invention to provide photographic printing apparatus arranging an amplifier of automatic gain controlling type as the said high frequency amplifier 12 by which the high frequency of comparatively small amplitude to be produced by minute density variations contained in the and over- and under-exposure portions of the original plate can be expanded and amplified while the high frequency of comparatively large amplitude corresponding to minute density variations contained in the proper exposure portion can be amplified at a rather compressed rate as compared with the former, thus avoiding an excessive amplification of alternating current of larger amplitude even when the alternating current of comparatively smaller amplitude will be fully amplified, a satisfactory printed images of which the contrast is averaged in every detail can be obtained.

It is also among the objects of this invention to provide photographic printing apparatus arranging a frequency divider with a variable frequency characteristics and amplifiers capable of varying these degrees of amplitude and polarities by which an automatic dodging printing of by far a great variety of pictures can be realized.

Figure 2:
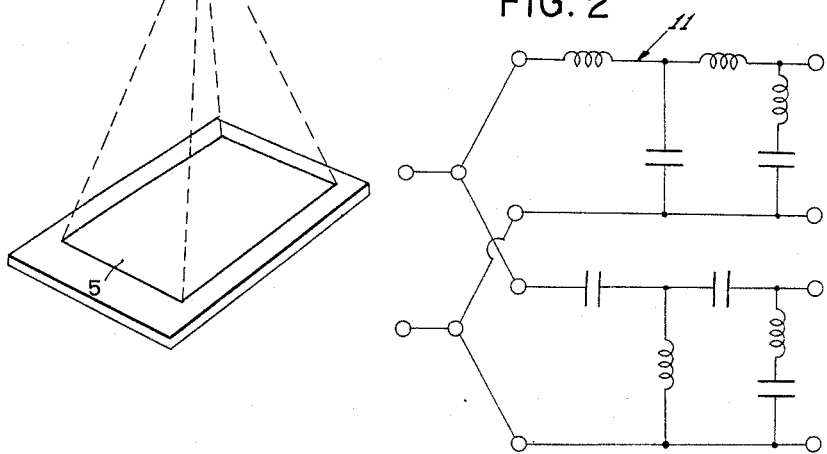
FIG. 2 is an example illustration of circuit of a frequency divider used in an apparatus employing the invention.

The supplementary explanation may be stated as follows:

The light input of the phototube necessary for acquiring feed-back signals may be obtained either by deflecting part of the printing beam of light by means of a half mirror or by using the reflection light reflected from a surface of printing paper or by using the light passing through the printing paper; in FIG. 1 a part of the electrode comprising the electron gun of the cathode ray tube and the power source for the electron accelerating electrode are omitted for convenience sake; many kinds of frequency dividers may be employed at option in this invention, however, FIG. 2 shows particularly one example of the comparatively simple frequency divider. In these figures, the dotted lines indicate rays of light and their tracks, and the sketches are used to represent the optical lens systems for convenience's sake. However, it is needless to say that actually these systems are incorporated in suitable supporters and consist of one or several pieces of lenses. Also, a field lens is usually placed directly at the back of an original plate in such case, but it has also been omitted for convenience's sake.

What we claim is:

1. Photographic apparatus comprising supporting means for a transparency and a photosensitive surface, a light source and focussing means therefor producing a beam sharply focussed on and scanning said transparency and surface, light intensity sensing and transducing means disposed in the path of light traversing said transparency from said source, means in circuit with said transducing means for separating its output into relatively high and low frequency signal components corresponding to gross and detail contrast of said transparency, and feedback means in circuit with said separating means and light source continuously modifying the intensity of said source as functions of said components.

2. Photographic apparatus according to claim 1 wherein said feedback means includes a negative feedback circuit for said low frequency signal components and a positive feedback circuit for said high frequency signal components.

3. Photographic apparatus according to claim 1 wherein said feedback means includes a negative feedback circuit for said high frequency signal components and a positive feedback circuit for said low frequency signal components.

4. Photographic apparatus according to claim 1 wherein said feedback means includes an amplifier for said high frequency signal components incorporating automatic gain control.

5. Photographic apparatus according to claim 1 including means for adjusting the amplitudes of said components.

6. Photographic apparatus according to claim 1 including means for modifying the frequency ranges of said components.

7. Photographic apparatus according to claim 1 wherein said light source is a cathode ray tube having a fluorescent screen.

References Cited by the Examiner

UNITED STATES PATENTS

| | | | |
|---|---|---|---|
| 2,842,025 | 7/58 | Craig. | |
| 2,927,520 | 3/60 | Craig | 95—73 |
| 2,988,978 | 6/61 | Craig | 95—73 |
| 2,989,909 | 6/61 | Reed | 95—73 |
| 3,000,286 | 9/61 | Elphick | 95—73 |

EVON C. BLUNK, *Primary Examiner.*